(12) United States Patent
Uezono et al.

(10) Patent No.: US 12,053,797 B2
(45) Date of Patent: Aug. 6, 2024

(54) METHOD OF PRODUCING ELECTRODE, AND ELECTRODE PRODUCTION APPARATUS

(71) Applicant: TOYOTA JIDOSHA KABUSHIKI KAISHA, Toyota (JP)

(72) Inventors: Tomoyuki Uezono, Toyota (JP); Momoka Oda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/851,827

(22) Filed: Jun. 28, 2022

(65) Prior Publication Data
US 2023/0109122 A1 Apr. 6, 2023

(30) Foreign Application Priority Data
Jul. 14, 2021 (JP) .................................. 2021-116280

(51) Int. Cl.
| | |
|---|---|
| *H01M 4/04* | (2006.01) |
| *B05B 5/08* | (2006.01) |
| *B05D 1/06* | (2006.01) |
| *H01M 4/66* | (2006.01) |
| *B05B 7/00* | (2006.01) |

(Continued)

(52) U.S. Cl.
CPC .............. *B05D 1/06* (2013.01); *B05B 5/081* (2013.01); *H01M 4/0404* (2013.01); *H01M 4/0419* (2013.01); *H01M 4/043* (2013.01); *H01M 4/0471* (2013.01); *H01M 4/661* (2013.01); *B05B 7/00* (2013.01); *B05D 1/007* (2013.01);

(Continued)

(58) Field of Classification Search
CPC . B05D 1/06; B05D 1/007; B05D 1/02; B05D 3/0253; B05D 3/12; B05B 5/081; B05B 7/00; H01M 4/0404; H01M 4/0421; H01M 4/0419; H01M 4/043; H01M 4/0471; H01M 4/661
USPC ......................................................... 427/475
See application file for complete search history.

(56) References Cited

U.S. PATENT DOCUMENTS

| | | | | |
|---|---|---|---|---|
| 5,110,618 | A | * | 5/1992 | Faust ........................ B05B 5/08 427/482 |
| 5,534,309 | A | * | 7/1996 | Liu ...................... H01L 21/6715 438/758 |

(Continued)

FOREIGN PATENT DOCUMENTS

| | | |
|---|---|---|
| DE | 10 2013 113 169 A1 | 5/2015 |
| JP | 2016-517139 A | 6/2016 |

(Continued)

*Primary Examiner* — Brian K Talbot
(74) *Attorney, Agent, or Firm* — Oliff PLC (57) ABSTRACT

An aerosol including an active material powder, a binder, and a gas is prepared. An electric field is formed between a substrate and a porous electrode. The aerosol is electrically charged. The aerosol after the electrically charging is introduced into the electric field. The aerosol passes through the porous electrode and thereby the aerosol is introduced into the electric field. At the time of the aerosol passing through the porous electrode, the aerosol comes into contact with the porous electrode and thereby the aerosol is electrically charged. In the electric field, the aerosol after the electrically charging flies toward the substrate due to electrostatic force. The aerosol adheres to a surface of the substrate and thereby an active material layer is formed.

8 Claims, 7 Drawing Sheets

(51) Int. Cl.
*B05D 1/00* (2006.01)
*B05D 1/02* (2006.01)
*B05D 3/02* (2006.01)
*B05D 5/12* (2006.01)

(52) U.S. Cl.
CPC .............. *B05D 1/02* (2013.01); *B05D 3/0254* (2013.01); *B05D 5/12* (2013.01); *H01M 4/0421* (2013.01)

(56) References Cited

U.S. PATENT DOCUMENTS

| | | | | |
|---|---|---|---|---|
| 5,916,640 | A * | 6/1999 | Liu | B05B 7/0012 239/707 |
| 6,349,668 | B1 * | 2/2002 | Sun | B05D 1/04 118/728 |
| 6,607,597 | B2 * | 8/2003 | Sun | B05B 7/0012 118/308 |
| 6,798,127 | B2 * | 9/2004 | Mao | C23C 18/127 977/939 |
| 7,882,799 | B2 * | 2/2011 | Dick | H01L 21/67028 118/308 |
| 7,963,244 | B2 * | 6/2011 | Yang | B05B 5/082 239/707 |
| 8,062,697 | B2 * | 11/2011 | Yaniv | C01B 32/15 427/256 |
| 9,114,413 | B1 * | 8/2015 | Gomez | B05B 5/0533 |
| 10,328,453 | B2 * | 6/2019 | Nishi | B05D 3/065 |
| 2007/0254091 | A1 * | 11/2007 | Fredrickson | A61L 29/085 118/620 |
| 2010/0297213 | A1 * | 11/2010 | Dupont | B05B 5/14 424/447 |
| 2013/0192519 | A1 * | 8/2013 | Kim | C23C 24/04 118/50.1 |
| 2013/0323403 | A1 * | 12/2013 | Hoerr | B05B 1/06 427/2.24 |
| 2015/0372286 | A1 | 12/2015 | Bolandi et al. | |
| 2017/0125815 | A1 * | 5/2017 | Amin-Sanayei | H01M 10/0525 |
| 2018/0272366 | A1 * | 9/2018 | Cho | B05B 5/025 |
| 2019/0252668 | A1 * | 8/2019 | Phares | H01M 4/139 |
| 2020/0185788 | A1 * | 6/2020 | Xu | H01M 4/505 |

FOREIGN PATENT DOCUMENTS

| | | |
|---|---|---|
| JP | 2018-535091 A | 11/2018 |
| JP | 2018-192380 A | 12/2018 |
| JP | 2021-082396 A | 5/2021 |
| WO | 2017/083462 A1 | 5/2017 |

\* cited by examiner

METHOD OF PRODUCING ELECTRODE, AND ELECTRODE PRODUCTION APPARATUS

This nonprovisional application is based on Japanese Patent Application No. 2021-116280 filed on Jul. 14, 2021, with the Japan Patent Office, the entire contents of which are hereby incorporated by reference.

BACKGROUND

Field

The present disclosure relates to a method of producing an electrode, and to an electrode production apparatus.

Description of the Background Art

Japanese Patent Laying-Open No. 2018-192380 discloses an electrostatic powder coating device.

SUMMARY

A method for producing an electrode by electrostatic coating is suggested. For example, an electric field is formed between a needle electrode and a substrate. Into the electric field, powder (an electrode material) is sprayed. Corona discharge that occurs from the needle electrode makes the powder be electrically charged. The electrically charged powder adheres to the substrate due to electrostatic force.

Here, the electric field that is formed between the needle electrode and the substrate tends not to be uniform. Further, it seems to be difficult to electrically charge the powder that is drifting in the air, in a uniform fashion by corona discharge. For these reasons, the ratio of the amount of powder adhered to the substrate to the amount of powder originally introduced (hereinafter called "coating efficiency") tends to be low.

An object of the present disclosure is to provide a method of producing an electrode with a high coating efficiency.

Hereinafter, the technical configuration and effects of the present disclosure will be described. It should be noted that the action mechanism according to the present specification includes presumption. The action mechanism does not limit the technical scope of the present disclosure.

(1) A method of producing an electrode includes the following (a) to (d):

(a) preparing an aerosol, the aerosol including an active material powder, a binder, and a gas;

(b) forming an electric field between a substrate and a porous electrode;

(c) electrically charging the aerosol; and (d) introducing the aerosol after the electrically charging, into the electric field.

The aerosol passes through the porous electrode and thereby the aerosol is introduced into the electric field. At the time of the aerosol passing through the porous electrode, the aerosol comes into contact with the porous electrode and thereby the aerosol is electrically charged. In the electric field, the aerosol after the electrically charging flies toward the substrate due to electrostatic force. The aerosol adheres to a surface of the substrate and thereby an active material layer is formed.

The porous electrode according to the present disclosure serves as one of the poles of the electric field. Between the porous electrode and the substrate, a uniform electric field may be formed. Through the porous electrode, the aerosol (a precursor of the active material layer) is supplied to the electric field. At the time of passing through the porous electrode, the aerosol comes into contact with the porous electrode. Due to the contact between the porous electrode and the aerosol, electric charge is injected from the porous electrode into the aerosol. That is, the aerosol becomes electrically charged. The aerosol passing through the porous electrode is expected to be electrically charged in a uniform fashion. Further, because the porous electrode serves as one of the ends of the electric field, substantially the entire amount of the aerosol that has passed through the porous electrode is to be introduced into the electric field. These actions combined are expected to work synergistically to give a high coating efficiency.

(2) The gas may have a flow in a direction from the porous electrode toward the substrate. The flow of the gas may transport the aerosol to the electric field.

The aerosol may be transported by the flow of the gas. For example, the flow speed of the gas may put limitation on which particles can be transported. For example, particles having an excessively large mass may not be transported by the gas. By this, the particles that can be included in the active material layer may be selected. By this selection of the particles, a uniform active material layer is expected to be formed.

For example, the active material powder may include a coarse metal foreign object. The metal foreign object is unintended impurities. If the coarse metal foreign object enters into the active material layer, for example, the amount of self-discharge may be increased. For example, the flow speed of the gas may be adjusted so that a metal foreign object having a certain mass or greater will not be transported. By this, the coarse metal foreign object in the active material layer is expected to be decreased.

The coarse metal foreign object may have a shorter diameter of 50 μm or more, for example. The shorter diameter is measured in an image of the particle. The distance between two points located farthest apart from each other on the outline of the particle in an image of the particle is a longer diameter. The diameter that crosses the line defining the longer diameter at the central point of the line and runs perpendicular to the line is the shorter diameter. The shorter diameter may be equal to the longer diameter.

(3) The method of producing an electrode may further include the following (e), for example:

(e) applying at least one of pressure and heat to the active material layer to fix the active material layer to the substrate.

The above (e) is expected to enhance the peel strength of the active material layer, for example.

(4) The substrate may include a metal foil, for example.

The metal foil is capable of supporting the active material layer. The metal foil is capable of functioning as a current collector. Also, the metal foil is compatible with a roll-to-roll method. When the substrate includes the metal foil, productivity is expected to be enhanced, for example.

(5) An electrode production apparatus includes an aerosol-supplying part, a support part, and an electric-field-forming apparatus.

The aerosol-supplying part includes an aerosol-preparing part and a porous electrode. The aerosol-preparing part is to mix an active material powder, a binder, and a gas to prepare an aerosol. The porous electrode is interposed between the aerosol-preparing part and the support part.

The support part is to support a substrate. The substrate is positioned at a distance from the porous electrode.

The electric-field-forming apparatus is to form an electric field between the porous electrode and the support part. The aerosol-supplying part is to supply the aerosol to the electric field through the porous electrode.

In the electrode production apparatus according to the above (5), the method of producing an electrode according to the above (1) can be implemented, for example.

(6) The aerosol-supplying part may further include an air-supplying apparatus and a porous plate, for example. The porous plate is interposed between the air-supplying apparatus and the aerosol-preparing part. The air-supplying apparatus is to supply the gas to the aerosol-preparing part.

Letting the gas pass through the porous plate is expected to make the flow of the gas be uniform in an in-plane direction, for example. The "in-plane direction" refers to any direction in a plane that is perpendicular to the direction of the flow of the gas. When the flow of the gas is uniform, the composition of the aerosol is expected to be uniform, for example. As a result, a uniform active material layer is expected to be formed.

(7) The air-supplying apparatus may be to give the gas a flow in a direction from the porous electrode toward the substrate.

In the electrode production apparatus according to the above (7), the method of producing an electrode according to the above (2) can be implemented, for example.

(8) The aerosol-preparing part may include a stirring blade, for example. The stirring blade may be to stir the active material powder, the binder, and the gas together to prepare the aerosol.

(9) The support part may include a roll, for example. The substrate may include a metal foil, for example. The metal foil may be supported on a surface of the roll. The metal foil may be transferred by rotation of the roll.

The electrode production apparatus according to the above (9) is capable of carrying out continuous electrode production.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Definitions of Terms, Etc

Next, an embodiment of the present disclosure (which may also be simply called "the present embodiment") and an example of the present disclosure (which may also be simply called "the present example") will be described. It should be noted that neither the present embodiment nor the present example limits the technical scope of the present disclosure.

Herein, expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

In the method described in the present specification, the order for implementing a plurality of steps, operations, processes, and the like is not limited to the described order, unless otherwise specified. For example, a plurality of steps may proceed simultaneously. For example, a plurality of steps may be implemented in reverse order.

Herein, expressions such as "may" and "can" are not intended to mean "must" (obligation) but rather mean "there is a possibility" (tolerance).

Herein, a singular form also includes its plural meaning, unless otherwise specified. For example, "a particle" may mean not only "one particle" but also "a group of particles".

Herein, a numerical range such as "from 70 to 100%" includes both the upper limit and the lower limit, unless otherwise specified. That is, "from 70 to 100%" means a numerical range of "not less than 70% and not more than 100%". Moreover, any numerical value selected from a certain numerical range may be used as a new upper limit and/or a new lower limit. For example, any numerical value from a certain numerical range may be combined with any numerical value described in another location of the present specification or in a table or a drawing, for example, to create a new numerical range.

Herein, all the numerical values are regarded as being modified by the term "about". The term "about" may mean±5%, 13%, ±1%, and/or the like, for example. Each numerical value is an approximate value that can vary depending on the implementation configuration of the technique according to the present disclosure. Each numerical value is expressed in significant figures. Each of the measured values and the like may be rounded off based on the number of the significant figures. Each numerical value may include an error occurring due to an identification limit of the measurement apparatus, for example.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

Any geometric term herein (such as "parallel", "vertical", and "perpendicular", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the technique according to the present disclosure. Further, a part of a configuration may have been omitted.

"Aerosol" herein refers to a dispersion system in which at least one of solid and liquid is dispersed in gas Aerosol may also be called "fume", for example. The appearance of aerosol may be described as cloud-like or smoke-like, for example.

"D50" herein refers to a particle size in volume-based particle size distribution at which cumulative frequency of particle sizes accumulated from a small size side reaches 50%. The volume-based particle size distribution may be obtained by measurement with a laser-diffraction particle size distribution analyzer.

"Melting point" herein refers to the peak-top temperature for a melting peak (an endothermic peak) of a DSC (Differential Scanning Calorimetry) curve. The DSC curve may be measured in accordance with "JIS K 7121". "Near a melting point" may refer to the range of ±20° C. from the melting point, for example.

<Method of Producing Electrode>

Figure 1:
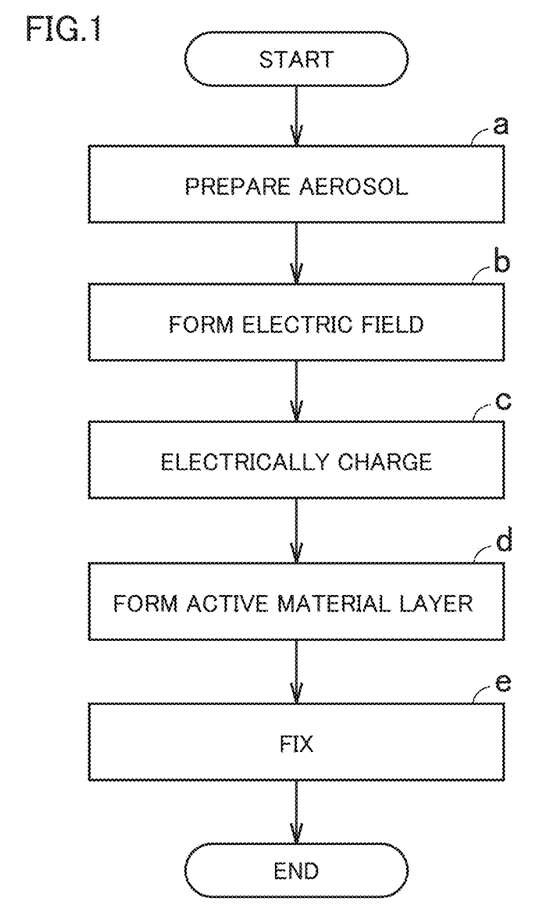
FIG. 1 is a schematic flowchart illustrating a method of producing an electrode according to the present embodiment.

FIG. 1 is a schematic flowchart illustrating a method of producing an electrode according to the present embodiment. Hereinafter, the "method of producing an electrode according to the present embodiment" may be simply called "the present production method". The present production method includes "(a) preparing an aerosol", "(b) forming an electric field", "(c) electrically charging", and "(d) forming an active material layer". The present production method may further include "(e) fixing" and the like, for example, after "(d) forming an active material layer".

In the present production method, an electrode for a lithium-ion battery may be produced. However, a lithium-ion battery is merely an example. The present production method may be applied to any battery system. In the present production method, at least one of a positive electrode and a negative electrode may be produced.

<<(a) Preparing Aerosol>>

The present production method includes preparing an aerosol that includes an active material powder, a binder, and a gas. The aerosol may be prepared by mixing the active material powder, the binder, and the gas.

<Active Material Powder>

The active material powder includes active material particles. The active material powder is a group of active material particles. The active material powder may consist essentially of active material particles. Each active material particle may be an aggregate of primary particles (namely, may be a secondary particle). In the aerosol, individual active material particles (secondary particles) may not be aggregated any more but they may be rather dispersed and floating. In the aerosol, substantially all the active material particles (secondary particles) may not be aggregated any more but they may be rather dispersed and floating. In the aerosol, some of the active material particles may be aggregated.

The active material powder may also include a very small amount of a metal foreign object. For example, during production of the active material powder, the production apparatus may wear, causing a metal foreign object to enter into the active material powder. The metal foreign object may include stainless steel (SUS), iron (Fe), copper (Cu), and/or the like, for example.

The active material powder may have a D50 from 1 to 30 μm, or may have a D50 from 1 to 20 μm, or may have a D50 from 1 to 10 pin, for example.

The active material particle causes electrode reaction. The active material particle may include an optional component. The active material particle may include a positive electrode active material, for example. The active material particle may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$, and/or the like, for example.

The active material particle may include a negative electrode active material, for example. The active material particle may include, for example, at least one selected from the group consisting of graphite, soft carbon, hard carbon, silicon, silicon oxide, silicon-based alloy, tin, tin oxide, tin-based alloy, and $Li_4Ti_5O_{12}$.

<Binder>

The binder may be in powder form. The binder may bond a solid material to another solid material in the active material layer. The amount of the binder to be used may be, for example, from 0.1 to 10 parts by mass relative to 100 parts by mass of the active material powder. The binder may include an optional component. The binder may include, for example, at least one selected from the group consisting of polyvinylidene difluoride (PVdF), polytetrafluoroethylene (PTFE), vinylidene difluoride-hexafluoropropylene copolymer (PVdF-HFP), styrene-butadiene rubber (SBR), carboxymethylcellulose (CMC), polyimide (PI), polyamide-imide (PAI), and polyacrylic acid (PAA).

<Gas>

The gas is a dispersion medium for the aerosol. The gas may include an optional component. The gas may include, for example, at least one selected from the group consisting of air, nitrogen gas, and argon gas. For example, when the dispersoid (such as the active material powder and/or the solid electrolyte) in the aerosol is readily reacts with moisture in the air, an inert gas (such as nitrogen gas and/or argon gas) may be used.

<Optional Component>

The aerosol may further include a conductive material, for example. The conductive material may be in powder form. The conductive material may form an electron conduction path in the active material layer. The amount of the conductive material to be used may be from 0.1 to 10 parts by mass relative to 100 parts by mass of the active material powder. The conductive material may include an optional component. The conductive material may include a conductive carbon particle, a conductive carbon fiber, and/or the like, for example. The conductive material may include, for example, at least one selected from the group consisting of carbon black, vapor grown carbon fiber, carbon nanotube, and graphene flake. The carbon black may include, for example, at least one selected from the group consisting of acetylene black, furnace black, channel black, and thermal black.

The aerosol may further include a solvent, for example. The solvent is liquid. For example, the solvent may be in fume form. For example, the binder may absorb the solvent and be swollen. The solvent may include an optional component. The solvent may include, for example, at least one selected from the group consisting of water, N-methyl-2-pyrrolidone (NMP), and butyl butyrate.

The aerosol may further include a solid electrolyte, for example. That is, in the present production method, an electrode for an all-solid-state battery may also be produced. The solid electrolyte may be in powder form. The solid electrolyte may form an ion conduction path in the active material layer. The solid electrolyte may include an optional component. The solid electrolyte may include, for example, at least one selected from the group consisting of $Li_2S$—$P_2S_5$, $LiI$—$Li_2S$—$P_2S_5$, $LiBr$—$Li_2S$—$P_2S_5$, and $LiI$—$LiBr$—$Li_2S$—$P_2S_5$.

<Composite Particles>

The present production method may include preparing composite particles, for example. Hereinafter, a group of composite particles (powder) is also called "composite powder".

The composite particle includes an active material particle and other solid materials. For example, when the active material particle and these other solid materials are mixed under conditions where a strong shearing force is being applied, the composite particle may be formed. In the composite particle, a binder and a conductive material may be fixed to the surface of the active material particle, for example.

In the present embodiment, as described below, solid particles (an electrode material) fly in the air and thereby an active material layer is formed. When specific gravities of the materials vary, a lighter material may fly preferentially. This may result in a non-uniform composition of the active material layer. In the configuration in which the active material particle, the conductive material, and the binder form the composite particles, a uniform active material layer is expected to be formed.

After the composite particles are formed, the composite particles may be subjected to heat treatment at, for example, a temperature near the melting point of the binder. Due to this heat treatment, the binder is softened, melted, and re-solidified. As a result, the binder, the conductive material, and the like are expected to be firmly fixed to the surface of the active material particle. When the fixation is not firm, the conductive material and the like may be peeled off from the surface of the active material particle while the composite particles are flying, for example.

For example, when the composite particle includes a plurality of the active material particles (more specifically, when the composite particle is an aggregate of the active material particles), the flying ability of the composite particle may be decreased. It may be because the mass of the composite particle is increased. For example, the composite particle may include a single active material particle. That is, the binder, the conductive material, and the like may adhere to a single active material particle to form a single composite particle.

<<(b) Forming Electric Field>>

The present production method includes forming an electric field between a substrate and a porous electrode. In FIG. 1, for the sake of convenience, "(b) forming an electric field" is shown after "(a) preparing an aerosol". "(b) Forming an electric field" may be implemented at any timing as long as it is before "(c) electrically charging".

Figure 2:
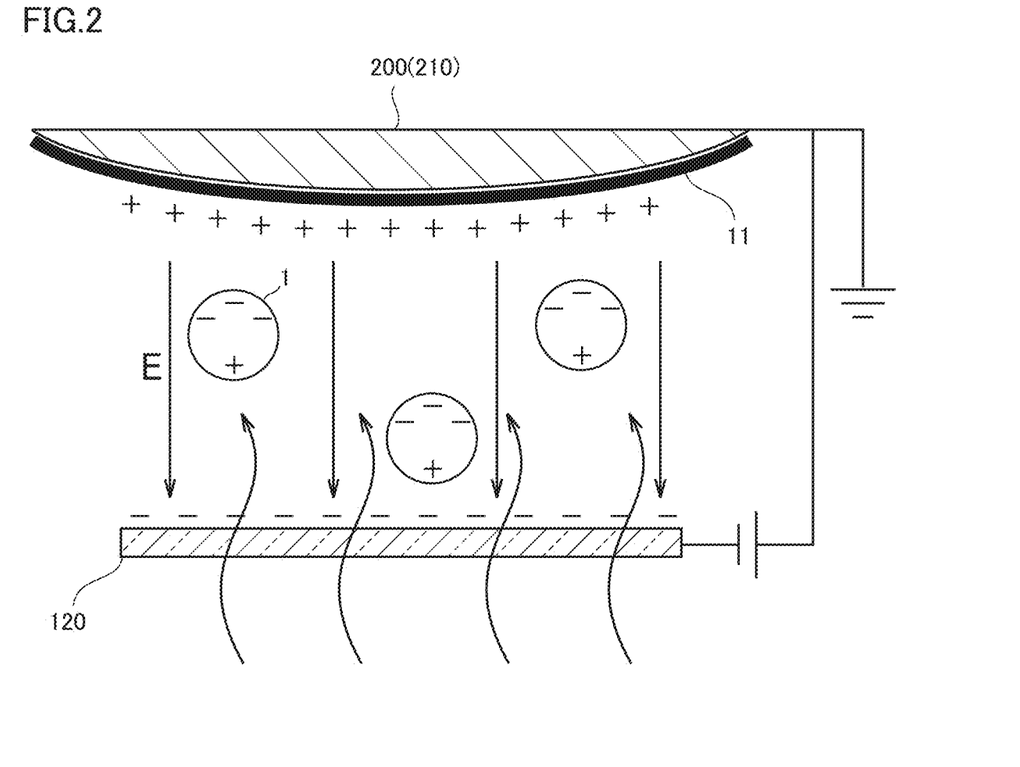
FIG. 2 is a conceptual view illustrating a process of producing an electrode.

FIG. 2 is a conceptual view illustrating a process of producing an electrode. A substrate 11 and a porous electrode 120 are prepared.

<Substrate>

Substrate 11 may be in sheet form, for example. Substrate 11 may be a current collector. Substrate 11 may include a metal foil, for example. Substrate 11 may include, for example, at least one selected from the group consisting of aluminum (Al) foil, Al alloy foil, Cu foil, Cu alloy foil, nickel (Ni) foil, Ni alloy foil, titanium (Ti) foil, and Ti alloy foil. Substrate 11 may have a thickness from 5 to 50 μm, or may have a thickness from 5 to 20 μm, for example.

<Porous Electrode>

Porous electrode 120 is electrically conductive. Porous electrode 120 may be made of metal, for example. Porous electrode 120 may be made of SUS, Fe, Ni, Al, Cu, and/or the like, for example.

Porous electrode 120 may have a flat outer profile, for example. When porous electrode 120 is flat, the uniformity of the electric field is expected to be enhanced. Porous electrode 120 may be in sheet form, in plate form, in fabric form, and/or the like, for example. Porous electrode 120 may have a thickness from 50 to 5000 μm or may have a thickness from 50 to 500 μm, for example.

Porous electrode 120 has a plurality of through pores formed in it. The through pores run through porous electrode 120 in the direction of the thickness of porous electrode 120. Porous electrode 120 may be in mesh form, for example. Porous electrode 120 may be a screen mesh, for example. The through pores allow passage of the active material particles (or the composite particles) therethrough. The inner diameter of the through pore may satisfy a certain relationship with the D50 of the active material powder, for example. The inner diameter of the through pore may be 3 to 10 times greater than the D50 of the active material powder, for example.

When porous electrode 120 is in mesh form, the inner diameter of the through pore may also be called "a sieve opening". The sieve opening may be from 30 to 300 μm, or may be from 50 to 150 μm, for example.

<Support Part>

For example, a support part 200 may support substrate 11. The details of support part 200 will be described below in detail. Both the support part 200 and the substrate 11 may be electrically conductive. Support part 200 and substrate 11 may be grounded.

<Electric Field>

Porous electrode 120 is positioned in such a manner that it faces substrate 11. Porous electrode 120 and support part 200 may be connected to a high-voltage electric power supply, for example. The high-voltage electric power supply, with support part 200 being grounded (GND), may apply a direct-current voltage to between support part 200 and porous electrode 120. This forms an electric field between substrate 11 and porous electrode 120. In FIG. 2, "E" and the linear arrows represent the direction of the electric field. For example, porous electrode 120 may have a negative electric potential relative to substrate 11 (support part 200). The difference in potential between substrate 11 (support part 200) and porous electrode 120 may be from 500 to 1500 V, for example.

The gap between substrate 11 and porous electrode 120 is the distance between the electrodes of the electric field. The gap between substrate 11 and porous electrode 120 is also the distance of electrostatic transportation of the aerosol. The gap between substrate 11 and porous electrode 120 may be 50 to 1000 times the D50 of the active material powder, for example. The gap between substrate 11 and porous electrode 120 may be from 1 to 10 mm, for example.

<<(c) Electrically Charging>>

The present production method includes electrically charging the aerosol. The aerosol moves through porous electrode 120 toward substrate 11. For example, the gas included in the aerosol may have a flow in a direction from porous electrode 120 toward substrate 11. By the flow of the gas, the aerosol may be transported. The curved arrows in FIG. 2 show the flow of the gas.

In FIG. 2, for the sake of convenience, the aerosol is illustrated as an active material particle 1. At the time of passing through porous electrode 120, the aerosol comes into contact with porous electrode 120. Due to the contact between the aerosol and porous electrode 120, electrons may move from porous electrode 120 to the aerosol (in particular, to active material particle 1). That is, due to the injection of electric charge, the aerosol may be electrically charged. Further, the aerosol after passing through porous electrode 120 may be strongly polarized by electrostatic induction.

<<(d) Forming Active Material Layer>>

The present production method includes introducing the aerosol after the electrically charging, into the electric field. The aerosol after passing through porous electrode 120 is naturally introduced into the electric field (see FIG. 2). It is because porous electrode 120 serves as one of the poles of the electric field. Substrate 11 (support part 200) serves as the other pole of the electric field. The aerosol is drawn to substrate 11 due to electrostatic force. That is, the aerosol flies toward substrate 11. The aerosol collides with and adheres to the surface of substrate 11. By this, an active material layer may be formed. That is, an electrode may be produced. When substrate 11 and the aerosol are continuously supplied into the electric field, the electrode may be continuously produced.

The electrostatic force may be adjusted by changing the electric field strength. The electric field strength is calculated by dividing the potential difference between substrate 11 and porous electrode 120 by the gap between substrate 11 and porous electrode 120. The electric field strength may be from 100000 to 300000 V/m, for example. When the electric field strength is too low, the active material particle may be less likely to adhere to the substrate. When the electric field strength is too high, the impact at the time of collision of the active material particles with substrate 11 is high. Due to the rebound of the impact, the active material particles may be less likely to adhere to substrate 11.

<<(e) Fixing>>

The present production method may include applying at least one of pressure and heat to the active material layer to fix the active material layer to the substrate. Fixing the active material layer is expected to enhance the peel strength of the active material layer, for example.

The pressure and heat may be separately applied. The pressure and the heat may be applied substantially at the same time. For example, the active material layer may be compressed with a heated roll, a heated plate, and/or the like. The temperature for heating the active material layer may be a temperature near the melting point of the binder, for example. The heating temperature may be from 80 to 200° C., or may be from 120 to 200° C., or may be from 140 to 180° C., for example.

The pressure may be adjusted depending on the target thickness, target density, and/or the like of the active material layer, for example A pressure from 50 to 200 MPa may be applied to the active material layer, for example.

<Electrode>

Figure 3:
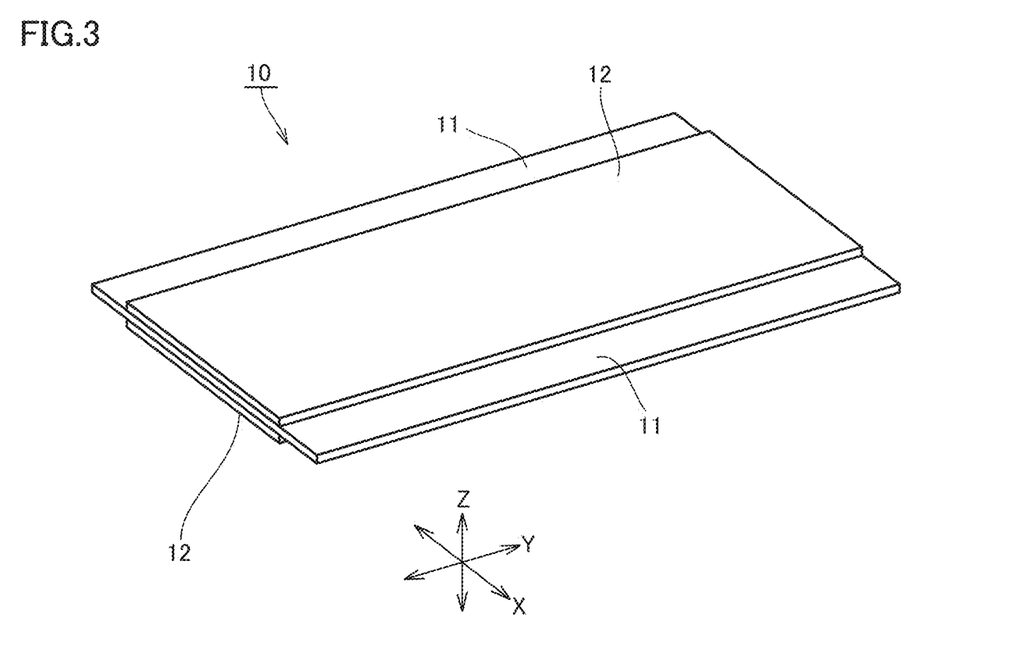
FIG. 3 is a conceptual view of an example of an electrode.

FIG. 3 is a conceptual view of an example of an electrode. An electrode 10 may be a positive electrode or may be a negative electrode. Electrode 10 may have any outer profile depending on the specifications of the battery. Electrode 10 may have a belt-like shape, for example. Electrode 10 includes substrate 11 and an active material layer 12. Active material layer 12 is placed on the surface of substrate 11. Active material layer 12 may be placed on only one side of substrate 11. Active material layer 12 may be placed on both sides of substrate 11.

Active material layer 12 may have any thickness. Active material layer 12 may have a thickness from 10 to 500 μm, or may have a thickness from 50 to 200 μm, for example. When electrode 10 is a positive electrode, active material layer 12 may have a density from 2 to 4 g/cm$^3$, for example. When electrode 10 is a negative electrode, active material layer 12 may have a density from 1 to 2 g/cm$^3$, for example. The density of active material layer 12 refers to "an apparent density". The apparent density is calculated by dividing the mass of active material layer 12 by the apparent volume of active material layer 12. The apparent volume includes the volume of pores.

For example, active material layer 12 may include the binder in a mass fraction from 1 to 10% and the conductive material in a mass fraction from 0 to 10%, with the remainder being made up of the active material powder. The active material powder may include a positive electrode active material, or may include a negative electrode active material.

In active material layer 12, substantially all the active material particles are expected to contribute to electrode reaction. This is because, in the present production method, the active material particles are not likely to aggregate during formation of active material layer 12. When substantially all the active material particles contribute to electrode reaction, input-output properties are expected to be enhanced, for example.

In contrast to this, in a conventional method of producing an electrode (those involving slurry application, for example), some active material particles aggregate to form aggregated bodies during the formation of the active material layer. The active material particles trapped inside the aggregated bodies tend not to contribute to electrode reaction.

<Electrode Production Apparatus>

Figure 4:
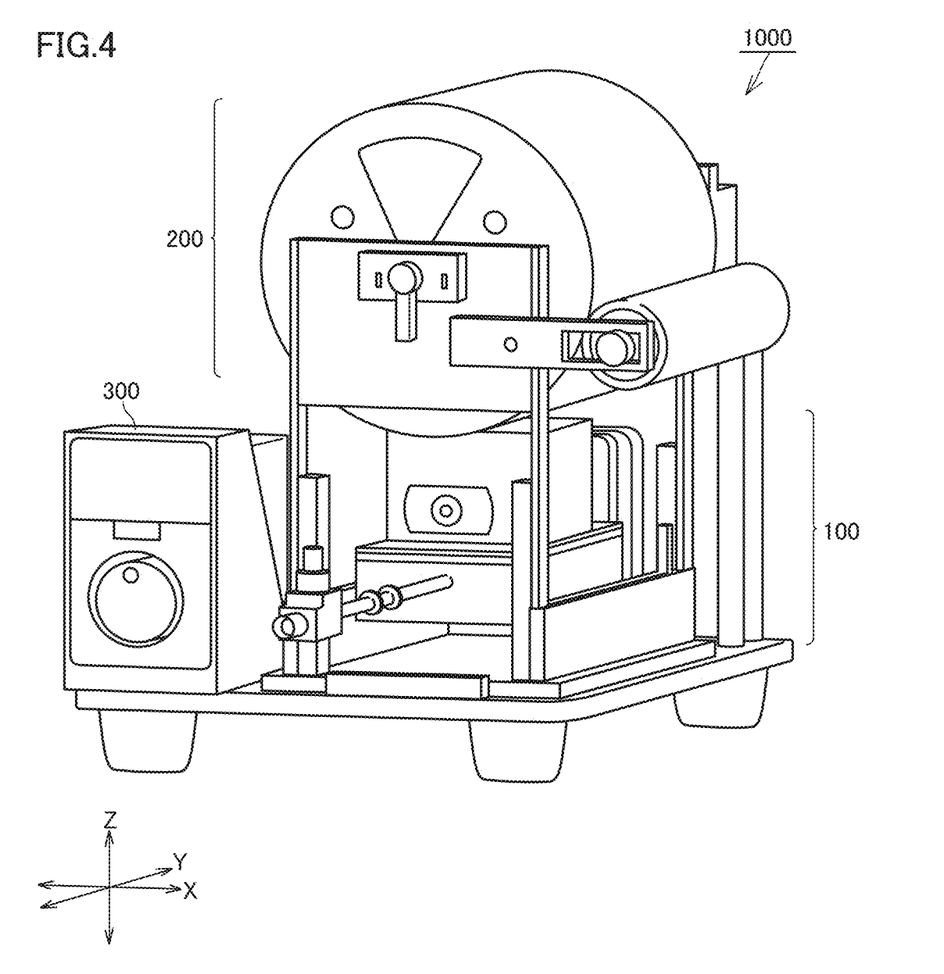
FIG. 4 is a schematic view illustrating an example of an electrode production apparatus according to the present embodiment.

FIG. 4 is a schematic view illustrating an example of an electrode production apparatus according to the present embodiment. Hereinafter, "the electrode production apparatus according to the present embodiment" is simply called "the present production apparatus". In the present production apparatus, the present production method described above may be implemented.

A present production apparatus 1000 includes an aerosol-supplying part 100, support part 200, and an electric-field-forming apparatus (not illustrated). Present production apparatus 1000 may include a control device 300. Control device 300 is capable of controlling the operation of each member. Control device 300 may include, for example, a motor controller and/or the like. For example, control device 300 may include the electric-field-forming apparatus. The electric-field-forming apparatus may include a high-voltage electric power supply and/or the like, for example. Control device 300 is capable of controlling the formation of the electric field.

<<Support Part>>

Figure 5:
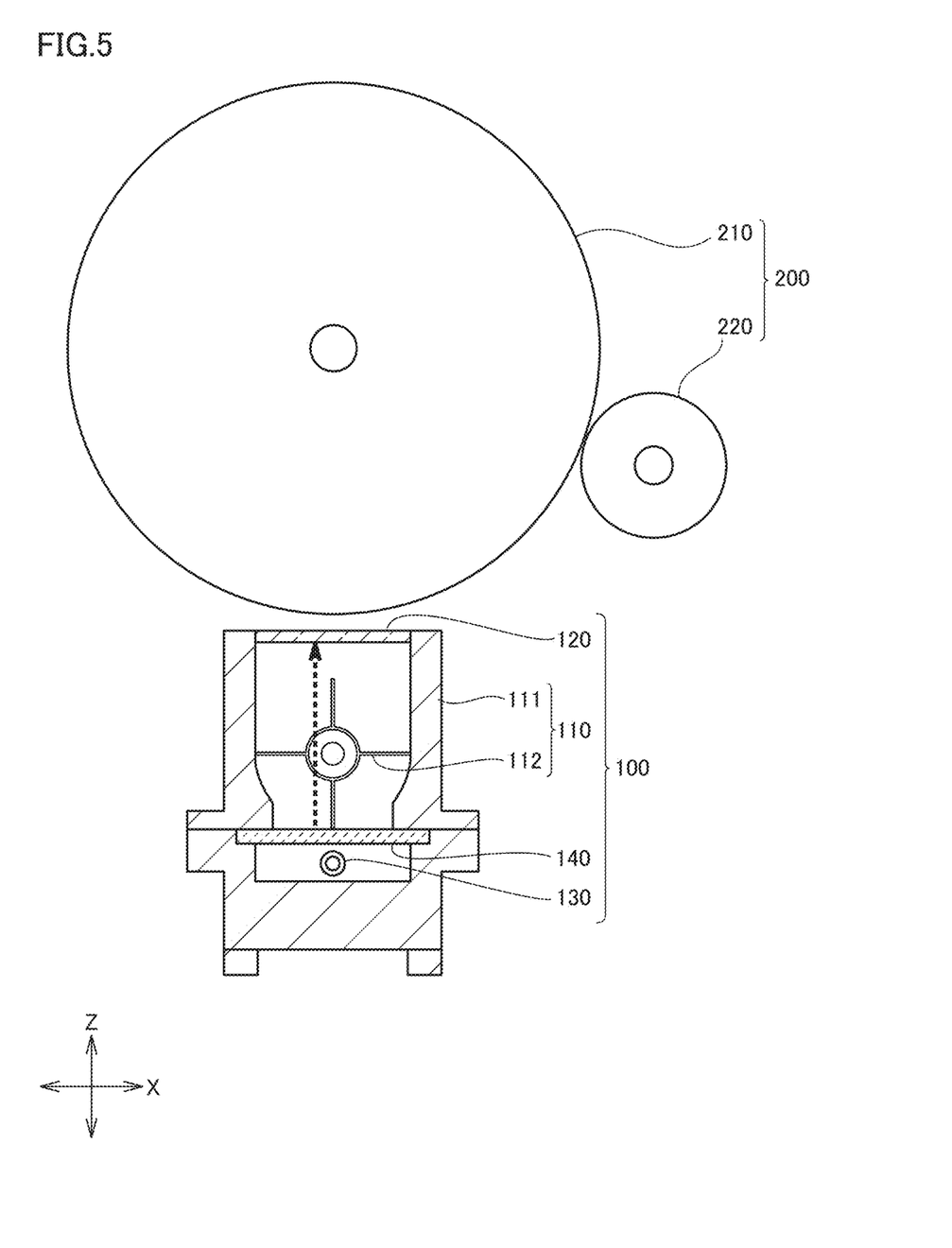
FIG. 5 is a schematic cross-sectional view of FIG. 4.

FIG. 5 is a schematic cross-sectional view of FIG. 4. In FIG. 5, control device 300 is omitted. Support part 200 is adjacent to aerosol-supplying part 100. Support part 200 may be positioned vertically above the aerosol-supplying part 100, for example. Support part 200 includes a first roll 210 and a second roll 220, for example. First roll 210 may also be called "a backup roll" and/or the like, for example. Support part 200 supports substrate 11 (see FIG. 2). Substrate 11 is positioned at a distance from porous electrode 120. Substrate 11 may include a metal foil. The metal foil may be supported on a surface of first roll 210. By the rotation of first roll 210, substrate 11 may be transferred in the circumferential direction of first roll 210.

First roll 210 may be electrically conductive. The entire first roll 210 may be electrically conductive. A part of first roll 210 may be electrically conductive. For example, the portion that is in contact with substrate 11 may be electrically conductive. For example, the surface layer of first roll 210 may be electrically conductive. First roll 210 is electrically connected to the electric-field-forming apparatus. First roll 210 may be grounded. While there is an electric field, first roll 210 serves as the counter electrode for porous electrode 120.

Second roll 220 may also be called "a nip roll" and/or the like, for example. Second roll 220 presses substrate 11 against the surface of first roll 210.

<<Aerosol-Supplying Part>>

Aerosol-supplying part 100 includes an aerosol-preparing part 110 and porous electrode 120. Aerosol-supplying part 100 may further include an air-supplying apparatus 130 and a porous plate 140.

<Aerosol-Preparing Part>

Aerosol-preparing part 110 mixes an active material powder, a binder, and a gas to prepare an aerosol. The details of the materials are as described above. Aerosol-preparing part 110 may include a vessel 111 and a stirring blade 112, for example. Into vessel 111, the materials are supplied. Stirring blade 112 stirs the materials, and thereby an aerosol may be prepared.

Air-supplying apparatus 130 may be positioned vertically below the aerosol-preparing part 110, for example. Porous plate 140 is interposed between air-supplying apparatus 130 and aerosol-preparing part 110. Porous plate 140 may be the bottom plate of vessel 111, for example.

The dotted arrow in FIG. 5 shows the pathway of aerosol transportation. Air-supplying apparatus 130 supplies the gas into aerosol-preparing part 110. Air-supplying apparatus 130 may give the gas a flow in a direction from porous electrode 120 toward substrate 11. In FIG. 5, the direction from porous electrode 120 toward substrate 11 is the Z-axis direction. The gas passes through porous plate 140 to be introduced into vessel 111. Letting the gas pass through porous plate 140 is expected to make the flow of the gas be uniform in an in-plane direction. When the flow of the gas is uniform, the composition of the aerosol is expected to be stable.

For example, the flow speed of the gas may be adjusted in order to prevent a coarse metal foreign object from entering into the aerosol. The metal foreign object may be, for example, impurities that have entered into the active material powder. For example, SUS particles may be regarded as a metal foreign object. For example, SUS particles having a shorter diameter of 50 μm may have a terminal velocity from 170 to 180 m/min, in theory. When the flow speed of the gas is sufficiently low relative to the terminal velocity of the metal foreign object, the metal foreign object will not fly in theory. That is, the metal foreign object may be removed from the aerosol. In other words, powder transportation by gas may function as a filter. The flow speed of the gas may be equal to or less than 0.5 times, or may be equal to or less than 0.25 times, greater than the terminal velocity of the metal foreign object, for example. The flow speed of the gas may be from 1 to 10 m/min, for example.

The active material powder and the like may be accumulated on porous plate 140. Porous plate 140 has a plurality of open pores formed in it. For example, the sieve opening of porous plate 140 may be adjusted so that the active material powder and the like are not buried in the open pores. The sieve opening of porous plate 140 may be 0.5 to 2 times greater than the D50 of the active material powder, for example. The sieve opening of porous plate 140 may be from 5 to 20 μm, for example. Porous plate 140 may be formed with any material. For example, porous plate 140 may be a sintered material made of ceramic powder. Porous plate 140 may be made of alumina, for example.

<Porous Electrode>

Porous electrode 120 is interposed between aerosol-preparing part 110 and support part 200 (first roll 210). The details of porous electrode 120 are as described above. Porous electrode 120 is connected to the electric-field-forming apparatus. While there is an electric field, porous electrode 120 serves as one of the poles of the electric field.

For example, the flow of the gas generated by air-supplying apparatus 130 may transport the aerosol to the electric field. That is, aerosol-supplying part 100 supplies the aerosol to the electric field through porous electrode 120. At the time of passing through porous electrode 120, the aerosol comes into contact with porous electrode 120. By this, electric charge is injected into the aerosol. That is, the aerosol is electrically charged. The aerosol after the electrically charging may be carried by the flow of the gas, pass through porous electrode 120, to be introduced into the electric field.

<<Electric-Field-Forming Apparatus>>

The electric-field-forming apparatus (not illustrated) forms an electric field between porous electrode 120 and support part 200 (first roll 210). For example, a high-voltage electric power supply is electrically connected to porous electrode 120 and first roll 210. First roll 210 is grounded. The high-voltage electric power supply applies a direct-current voltage to between porous electrode 120 and first roll 210. This forms an electric field between porous electrode 120 and first roll 210.

After introduced into the electric field, the aerosol is drawn to substrate 11 due to electrostatic force in the electric field. That is, the aerosol flies toward substrate 11. The aerosol adheres to the surface of substrate 11, and thereby active material layer 12 may be formed.

<<Positions of Each Member>>

Figure 6:
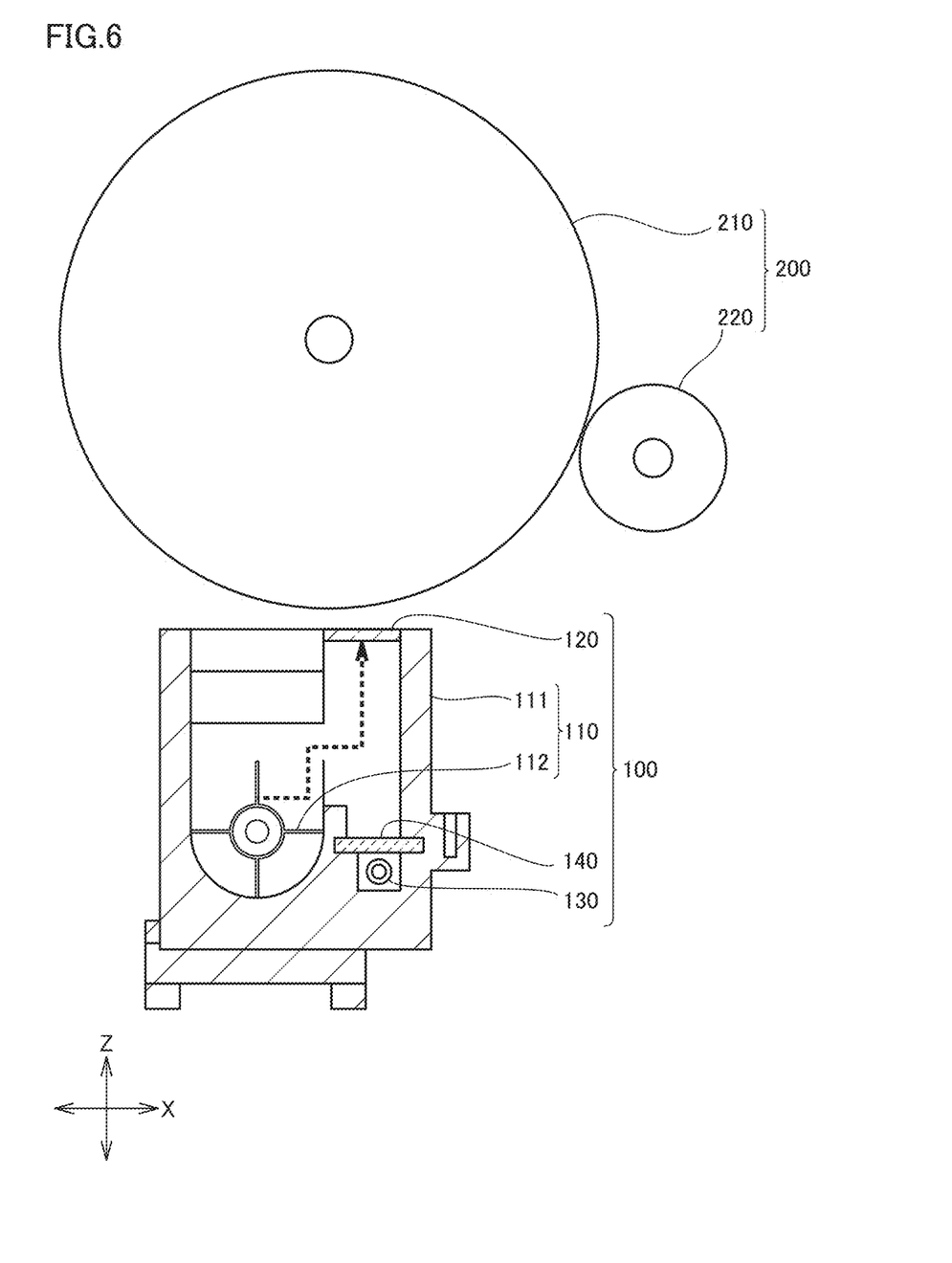
FIG. 6 is a schematic cross-sectional view of a second positioning example.

FIG. 6 is a schematic cross-sectional view of a second positioning example. In present production apparatus 1000, the position of each member is not limited. For example, in aerosol-supplying part 100, aerosol-preparing part 110 may be separated from air-supplying apparatus 130. In FIG. 6, aerosol-preparing part 110 is positioned in parallel with air-supplying apparatus 130. The dotted arrow in FIG. 6 shows the pathway of aerosol transportation. The pathway of aerosol transportation may be straight (see FIG. 5), or may be bent (see FIG. 6).

A first positioning example is given in FIG. 5. Referring to FIG. 5, aerosol-preparing part 110 and air-supplying apparatus 130 are positioned in series.

Figure 7:
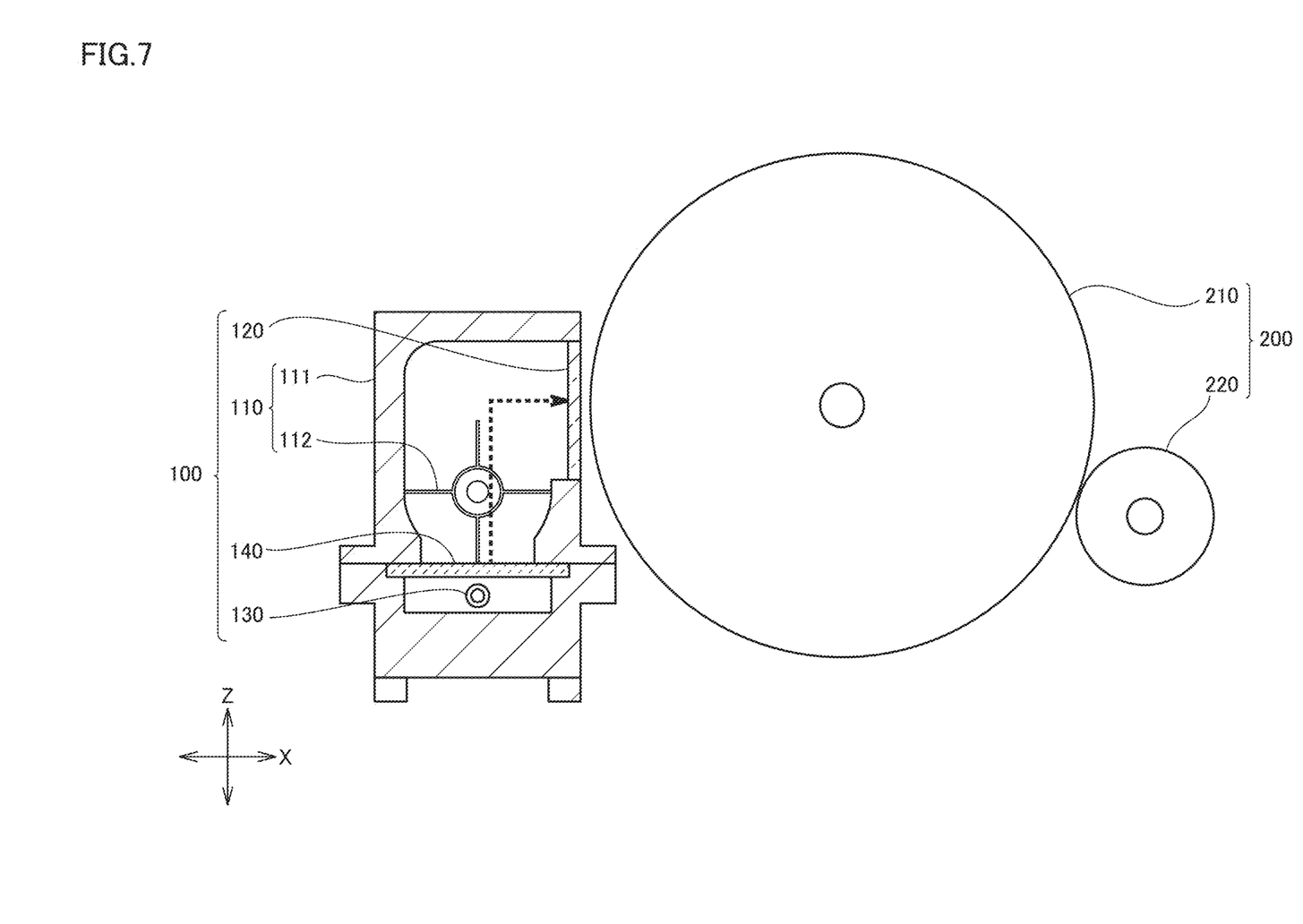
FIG. 7 is a schematic cross-sectional view of a third positioning example.

FIG. 7 is a schematic cross-sectional view of a third positioning example. For example, aerosol-supplying part 100 may be horizontally adjacent to support part 200.

EXAMPLES

Next, the present example is described.

First Production Example

In a first production example, a positive electrode was produced.

The below materials were prepared.
Active material powder: Li(NiCoMn)O$_2$
Conductive material: acetylene black
Binder: PVdF
Substrate: Al foil (thickness, 12 m)

A mixing apparatus "Mechano Hybrid" manufactured by Nippon Coke & Engineering Co., Ltd. was prepared. This apparatus includes a round tank (a mixing tank). The convection-promoting effect of the round tank generates a strong shearing force, which is capable of combining the solid materials together.

Into the round tank of Mechano Hybrid, the active material powder, the conductive material, and the binder were added. The blending ratio of the materials was "(active material powder)/(conductive material)/binder=90/5/5 (mass ratio)". The number of revolutions of the stirring blade was set at 10000 rpm. The materials were mixed for 10 minutes. Thus, composite powder was formed. The composite powder is a group of composite particles. It seems that each composite particle includes a single active material particle. It seems that the binder and the conductive material are fixed to the surface of the active material particle.

A metal tray was prepared. On the tray, the composite powder was thinly spread. The tray was stored in an oven for heat treatment to be performed on the composite powder. The temperature of the oven was set at 160° C. The duration of the storage was 30 minutes. It seems that the heat treatment caused the binder and the conductive material to be fixed to the surface of the active material particle.

The electrode production apparatus according to FIG. 5 was prepared. Specifications of its members are as follows.
Porous electrode 120: SUS screen mesh (sieve opening, 100 μm)
Porous plate 140: alumina porous plate (sieve opening, 10 μm; planar dimensions, 75 mm×75 mm)
Gap between porous electrode 120 and first roll 210: 4 mm
Electric field: porous electrode 120=−1000 V, first roll 210=0 V (GND)

Onto porous plate 140, the composite powder was supplied. By air-supplying apparatus 130, air was supplied to the composite powder. The volumetric flow rate of the air was 25 L/min. The composite powder and the air were stirred by stirring blade 112, and thereby an aerosol was prepared. The number of revolutions of stirring blade 112 was 120 rpm.

The aerosol was supplied to the electric field through porous electrode 120, and thereby active material layer 12 was formed on the surface of substrate 11. That is, electrode 10 was produced. The planar dimensions of active material layer 12 were 60 mm 200 mm.

In the first production example, air (25 L/min) passed through porous plate 140 (75 mm×75 mm), so the flow speed of the supplied air was 4.4 m/min. For example, SUS particles (shorter diameter, 50 μm) may be regarded as a metal foreign object. The radius of the SUS particles may be regarded as 2.5×10$^{-5}$ m. When the specific gravity of SUS is 7.93 g/cm$^3$, the mass of the SUS particles may be regarded as 5.19×10$^{-10}$ kg. From the radius and the mass of the SUS particles, the terminal velocity of the SUS particles at 25° C. and at 1 atm is estimated at 177.5 m/min. In the first production example, the flow speed of the air is sufficiently low relative to the terminal velocity of the SUS particles, so, in theory, the SUS particles are not transported by the air. That is, it seems that the SUS particles are less likely to enter into active material layer 12.

Electrode 10 was sandwiched between two heated plates (flat plates). The temperature of the heated plates was 160° C. By these heated plates, a load of 15 tf was applied to active material layer 12. By this, active material layer 12 is supposed to be fixed to substrate 11.

Figure 8:
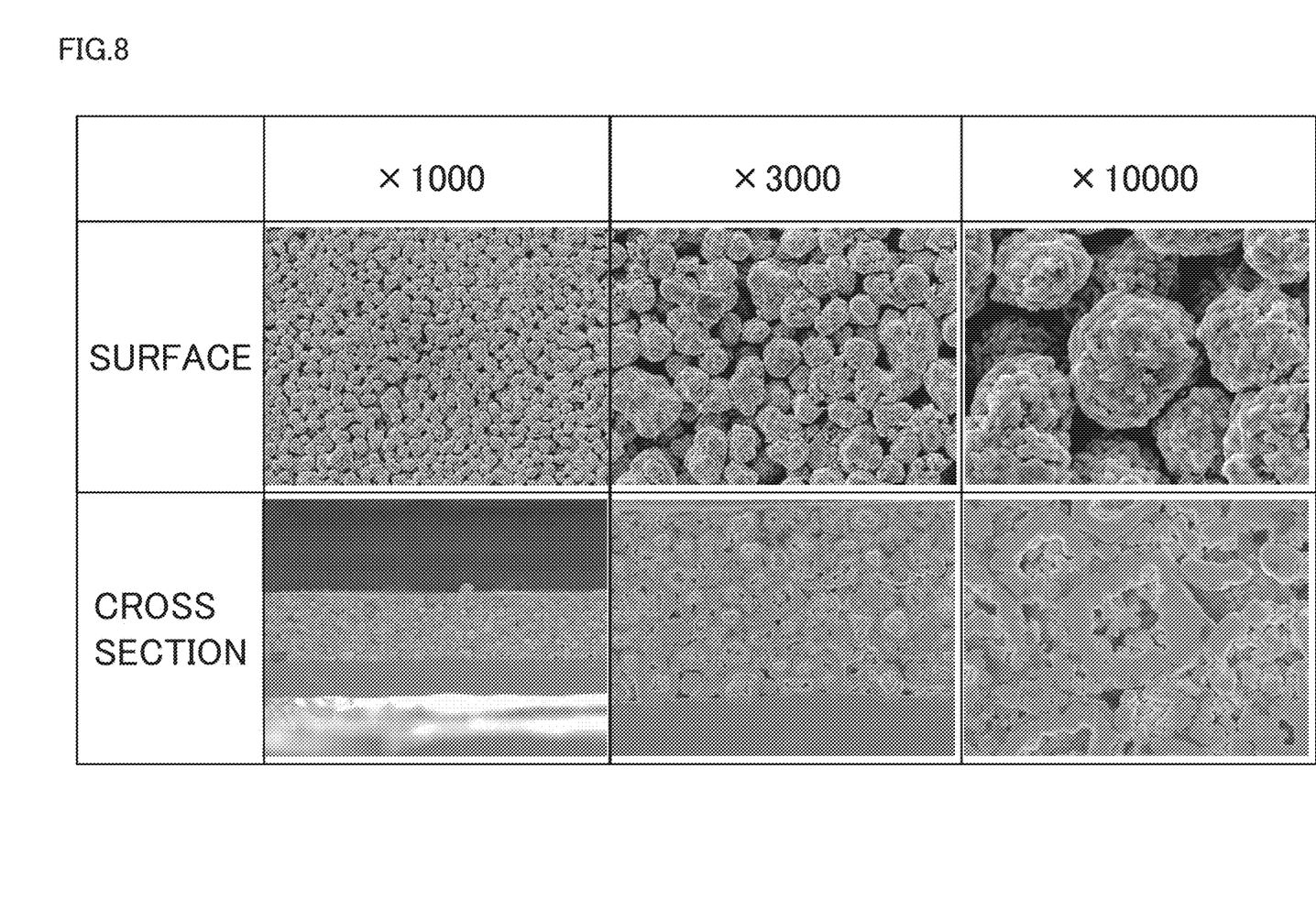
FIG. 8 is an electron micrograph of an active material layer according to a first production example.

FIG. 8 is an electron micrograph of an active material layer according to the first production example. FIG. 8 presents images of the surface and the cross section of the active material layer, at 1000-fold, 3000-fold, and 10000-fold magnifications. On the surface of the active material layer, the active material particles (composite particles) are uniformly distributed. Also in the cross section of the active material layer, the active material particles are uniformly distributed. In both the surface and the cross section of the active material layer, no aggregated active material particles are observed. Although it is not clearly seen in the images, the binder and the conductive material are fixed to the surface of the active material particle.

Second Production Example

In a second production example, a negative electrode was produced.

The below materials were prepared.
Active material powder: amorphous-carbon-coated graphite
Binder: PVdF
Substrate: Cu foil (thickness, 8 μm)

With regard to the amorphous-carbon-coated graphite, the surface of each graphite particle is coated with an amorphous carbon material. A mixing apparatus "High Speed Mixer" manufactured by Earthtechnica Co., Ltd. was prepared. This apparatus is capable of generating a relatively gentle shearing force during mixing. Into the mixing tank of the mixing apparatus, the active material powder and the binder were added. The blending ratio of the materials was "(active material powder)/binder=97.5/2.5 (mass ratio)". The number of revolutions of the stirring blade was set at 4500 rpm. The materials were mixed for 2 minutes. Thus, composite powder was formed. The composite powder is a group of composite particles. It seems that each composite particle includes a single active material particle. It seems that the binder is fixed to the surface of the active material particle.

Except these, the same procedure as in the first production example was carried out to produce an electrode. In the second production example, as in the first production example, formation of a uniform active material layer was observed.

The present embodiment and the present example are illustrative in any respect. The present embodiment and the present example are non-restrictive. The technical scope of the present disclosure encompasses any modifications within the meaning and the scope equivalent to the terms of the claims. For example, it is expected that certain configurations of the present embodiments and the present examples can be optionally combined.

What is claimed is:

1. A method of producing an electrode, the method comprising:
   (a) preparing an aerosol, the aerosol consisting of:
      composite particles consisting of solid components, the solid components including an active material particle and a binder fixed to a surface of the active material particle, and
      a gas;
   (b) forming an electric field between a substrate and a porous electrode, the electric field having an electric field strength in the range of from 100,000 to 300,000 V/m;
   (c) passing the aerosol through the porous electrode, whereby the aerosol comes into contact with the porous electrode and is electrically charged; and
   (d) introducing the electrically charged aerosol into the electric field,
   wherein:
   in the electric field,
      the electrically charged aerosol flies toward the substrate in a vertically upward direction due to electrostatic force, and
      the aerosol adheres to a surface of the substrate and thereby an active material layer is formed,
   the gas has a flow in a direction from the porous electrode toward the substrate at a flow speed in the range of from 1 to 10 m/min such that metal impurities present in the composite powder are filtered from the aerosol, and
   the flow of the gas transports the aerosol to the electric field.

2. The method of producing an electrode according to claim 1, wherein the method further comprises:
   (e) applying at least one of pressure and heat to the active material layer to fix the active material layer to the substrate.

3. The method of producing an electrode according to claim 1, wherein the substrate includes a metal foil.

4. The method of producing an electrode according to claim 1, wherein the gas is air.

5. The method of producing an electrode according to claim 1, wherein the gas is an inert gas.

6. The method of producing an electrode according to claim 1, wherein the gas is at least one selected from the group consisting of nitrogen gas and argon gas.

7. The method of producing an electrode according to claim 1, wherein the porous electrode comprises through pores that extend through the porous electrode in the vertically upward direction.

8. The method of producing an electrode according to claim 7, wherein an inner diameter of the through pores is 3 to 10 times greater than the D50 of the active material particle.

* * * * *